US008610095B2

(12) United States Patent
Yabu et al.

(10) Patent No.: US 8,610,095 B2
(45) Date of Patent: Dec. 17, 2013

(54) EXTREME ULTRAVIOLET LIGHT SOURCE DEVICE

(75) Inventors: Takayuki Yabu, Hiratsuka (JP); Takeshi Asayama, Hiratsuka (JP); Fumika Yoshida, Hiratsuka (JP); Osamu Wakabayashi, Hiratsuka (JP)

(73) Assignee: Gigaphoton Inc., Tochigi (JP)

( * ) Notice: Subject to any disclaimer, the term of this patent is extended or adjusted under 35 U.S.C. 154(b) by 381 days.

(21) Appl. No.: 12/695,630

(22) Filed: Jan. 28, 2010

(65) Prior Publication Data

US 2010/0200776 A1 Aug. 12, 2010

(30) Foreign Application Priority Data

Jan. 29, 2009 (JP) ................................ 2009-018668
Jan. 12, 2010 (JP) ................................ 2010-004105

(51) Int. Cl.
*G01J 3/10* (2006.01)
*G21K 5/00* (2006.01)

(52) U.S. Cl.
USPC .................... 250/504 R; 250/365; 250/41.16; 250/493.1; 378/119

(58) Field of Classification Search
USPC ....... 250/365, 423 R, 424, 425, 432 R, 461.1, 250/493.1, 504 R; 378/119
See application file for complete search history.

(56) References Cited

U.S. PATENT DOCUMENTS 6,338,893 B1 * 1/2002 Kodera et al. ................. 428/210
6,647,088 B1 11/2003 Schmidt et al.
6,972,421 B2 * 12/2005 Melnychuk et al. ...... 250/504 R
7,122,816 B2 * 10/2006 Algots et al. .............. 250/504 R
7,271,401 B2 * 9/2007 Imai et al. ................. 250/504 R
7,368,741 B2 * 5/2008 Melnychuk et al. ...... 250/504 R
7,378,673 B2 * 5/2008 Bykanov et al. ........... 250/503.1
7,427,766 B2 9/2008 Jonkers et al.
7,608,846 B2 * 10/2009 Nakano ..................... 250/504 R
7,642,533 B2 * 1/2010 Partio et al. ............... 250/504 R
7,843,632 B2 * 11/2010 Bowering ..................... 359/359
7,872,245 B2 * 1/2011 Vaschenko et al. ........ 250/492.2

(Continued)

FOREIGN PATENT DOCUMENTS

JP 2003-528710 A 9/2003
JP 2004-052075 2/2004

(Continued)

OTHER PUBLICATIONS

Notification of Reasons for Refusal Japanese Patent Application No. 2010 04105 dated Oct. 1, 2013 with English translation.

*Primary Examiner* — Bernard E Souw
(74) *Attorney, Agent, or Firm* — McDermott Will & Emery LLP

(57) ABSTRACT

An extreme ultraviolet light source device in accordance with the present invention suppresses a surface that comes into contact with a target material in a molten state from being eroded by the target material, being reacted with the target material, and being cut by the target material.

A target generating unit 120 injects molten tin in a droplet shape as a target 201 into a chamber 101. A protective coating provided with an erosion resistance property to tin is configured on a section that comes into contact with tin in a molten state for each face of a nozzle part 121 and a tank part 122. Alternatively, a part that comes into contact with tin in a molten state is made of a material provided with an erosion resistance property and a heat resistance property.

13 Claims, 15 Drawing Sheets

(56) References Cited

U.S. PATENT DOCUMENTS

| | | | | |
|---|---|---|---|---|
| 8,003,962 | B2 * | 8/2011 | Someya et al. | 250/504 R |
| 8,138,487 | B2 * | 3/2012 | Vaschenko et al. | 250/504 R |
| 8,143,606 | B2 * | 3/2012 | Komori et al. | 250/504 R |
| 8,198,615 | B2 * | 6/2012 | Bykanov et al. | 250/504 R |
| 8,242,474 | B2 * | 8/2012 | Nagai et al. | 250/504 R |
| 8,436,328 | B2 * | 5/2013 | Yanagida et al. | 250/504 R |
| 8,445,877 | B2 * | 5/2013 | Someya et al. | 250/504 R |
| 8,450,706 | B2 * | 5/2013 | Abe et al. | 250/496.1 |
| 8,519,367 | B2 * | 8/2013 | Metzmacher et al. | 250/504 R |
| 2004/0108473 | A1 * | 6/2004 | Melnychuk et al. | 250/504 R |
| 2004/0129896 | A1 | 7/2004 | Schmidt et al. | |
| 2005/0230645 | A1 * | 10/2005 | Melnychuk et al. | 250/504 R |
| 2006/0186356 | A1 * | 8/2006 | Imai et al. | 250/504 R |
| 2007/0228298 | A1 * | 10/2007 | Komori et al. | 250/493.1 |
| 2008/0023657 | A1 * | 1/2008 | Melnychuk et al. | 250/504 R |
| 2008/0043321 | A1 * | 2/2008 | Bowering et al. | 359/359 |
| 2009/0218522 | A1 * | 9/2009 | Nakano et al. | 250/504 R |
| 2009/0272919 | A1 * | 11/2009 | Abe et al. | 250/504 R |
| 2010/0025600 | A1 * | 2/2010 | Chavez et al. | 250/504 R |
| 2010/0176312 | A1 * | 7/2010 | Komori et al. | 250/504 R |
| 2010/0176313 | A1 * | 7/2010 | Melnychuk et al. | 250/504 R |
| 2010/0193711 | A1 * | 8/2010 | Watanabe et al. | 250/504 R |
| 2010/0258747 | A1 * | 10/2010 | Vaschenko et al. | 250/504 R |
| 2011/0284774 | A1 | 11/2011 | Ishihara et al. | |
| 2012/0119118 | A1 * | 5/2012 | Watanabe et al. | 250/504 R |

FOREIGN PATENT DOCUMENTS

| | | | |
|---|---|---|---|
| JP | 2004-188449 | | 7/2004 |
| JP | 2004-533704 | A | 11/2004 |
| JP | 2006-028638 | A | 2/2006 |
| JP | 2007-505460 | A | 3/2007 |
| JP | 2007-283331 | A | 11/2007 |
| JP | 2008-226462 | | 9/2008 |
| JP | 2011-527503 | A | 10/2011 |
| WO | 2010/0137625 | A1 | 12/2010 |

* cited by examiner

EXTREME ULTRAVIOLET LIGHT SOURCE DEVICE

CROSS-REFERENCE TO RELATED APPLICATION(S)

This application claims priority to Japanese JP2009-018668, filed Jan. 29, 2009, and JP 2010-004105, filed Jan. 12, 2010. The entire contents of the above identified applications are incorporated herein by reference.

TECHNICAL FIELD

The present invention relates to an extreme ultraviolet light source device.

BACKGROUND ART

A semiconductor chip may be created, for example, by a reduction projection of a mask on which a circuit pattern has been drawn onto a wafer having a resist applied thereon and by repeatedly performing processing such as an etching and a thin film formation. The progressive reduction of the scale of semiconductor processing demands the use of radiation of a further short wavelength.

Thus, a research is being made on a semiconductor exposure technique which uses a radiation of an extremely short wavelength of 13.5 nm or so and a reduction optics system. This type of technique is termed an EUVL (Extreme Ultra Violet Lithography: an exposure using an extreme ultra violet light). Hereafter, an extreme ultraviolet light will be abbreviated as "EUV light".

Three types of EUV light sources are known for example: an LPP (Laser Produced Plasma: plasma produced by a laser) type light source, a DPP (Discharge Produced Plasma) type light source, and an SR (Synchrotron Radiation) type light source.

The LPP type light source is a light source which generates a plasma by irradiating a target material with a laser beam, and employs an EUV light that is emitted from this plasma. The DPP type light source is a light source which employs a plasma that is generated by an electrical discharge. The SR (synchrotron radiation) is a light source which uses an orbital radiation.

Of those three types of light sources, the LPP type light source is more likely to obtain an EUV light of a higher output power as compared to the other two types because the LPP type light source can provide an increased plasma density and can ensure a larger solid angle over which the light is collected (see Patent Citation 1).

For the EUV light source device of the LPP type, a metal such as tin (Sn) is used as a target material in large part. The EUV light source device of the LPP type is provided with a target supply device. The target supply device heats and melts tin, and makes tin blow out as a droplet from a nozzle having a minor diameter.

It is known that an oxide film is formed on the surface of a stainless steel in a field of a solder bath in which a so-called lead-free solder is used although it is irrelevant to the technical field of an extreme ultraviolet light source device (see Patent Citation 2 and Patent Citation 3).

Moreover, a technique in which a target material is collected for a recycle is also known (see Patent Citation 4).

CITATION LIST

Patent Literature

[Patent Citation 1]

Japanese Patent Application Laid-Open Publication No. 2006-80255

[Patent Citation 2]

Japanese Patent Application Laid-Open Publication No. 2004-188449

[Patent Citation 3]

Japanese Patent Application Laid-Open Publication No. 2004-52075

[Patent Citation 4]

Japanese Patent Application Laid-Open Publication No. 2008-226462

SUMMARY OF INVENTION

Technical Problems

The target supply device is formed by a stainless steel that is excellent in a pressure resistance property and a thermal conductivity. However, since tin has a high reactivity, an inner wall that comes into contact with tin is eroded by tin in the case in which the target supply device is used continuously. Consequently, component materials of a stainless steel (Fe, Cr, and Ni for instance) or impurities of a stainless steel and a target material (sulfur (S) and oxygen (O) for instance) are reacted with tin to be a solid body. Particles of the reacted solid body cause a nozzle to be choked or clogged.

In the case in which a nozzle is choked or clogged, it is impossible to make a droplet in a stable shape blow out to an accurate position at an accurate speed. As a result, a target (droplet) cannot be irradiated with a driver laser beam, and a light focusing point of a laser beam cannot be easily corresponded to the center of a droplet disadvantageously. Consequently, the following two problems arise.

At first, more debris occurs, whereby an EUV light collector mirror is damaged and a lifetime of the mirror is shortened. Second, the conversion efficiency of an EUV light is reduced and varied, and an energy of a generated EUV light is reduced and a stability of an energy is degraded.

Moreover, in the Patent Citation 3 (JP-A-2004-52075), a surface roughness (Ra) on an oxidation layer side is specified to be in the range of 2 to 50 μm. In the case of a solder bath, there is less necessity to being conscious of a size of a particle. However, for an extreme ultraviolet light source device, since a target is ejected from a nozzle having an extremely minor diameter, a size of a particle leads to a problem.

The present invention was made in consideration of the above problems, and an object of the present invention is to provide an extreme ultraviolet light source device in which a stable extreme ultraviolet light of a high output power can be generated by stabilizing a supply (a generation) of a target material.

Another object of the present invention is to provide an extreme ultraviolet light source device wherein in an inner surface of a device related to a target supply, a region that comes into contact with a target material is coated, a substrate that includes a surface that comes into contact with a target material is formed by using a prescribed material for the substrate or a configuration is made by a combination thereof to prevent a particle that is reacted with a surface coming into contact with a target material and that clogs a nozzle from being generated and to stable a generation of a target whereby a stable EUV light of a high output power can be generated. Other objects of the present invention will be clarified by the explanation of the modes described later.

Solution of Problem

In order to solve the above problems of the conventional art, an extreme ultraviolet light source device in accordance with a first aspect of the present invention is an extreme ultraviolet light source device that generates an extreme ultraviolet light by irradiating a target with a laser beam, comprising a chamber; a target generating unit that generates the target from a target material and supplies the generated target into the chamber; and a laser light source that generates an extreme ultraviolet light by irradiating the target in the chamber with a laser beam, wherein a specific region that comes into contact with the target material in the target generating unit is provided with an erosion resistance property and a corrosion resistance property to the target material.

Here, the erosion means being physically cut. For instance, in the case in which a target material is flown in a region that comes into contact with the target material, the surface of the region that comes into contact with the target material is physically abraded. As a result, a particle that has been cut from the surface is generated, and a nozzle that outputs a target is clogged with the particle disadvantageously. The erosion resistance property means that the surface of the region that comes into contact with the target material is less physically abraded.

On the other hand, the corrosion means being cut by a chemical reaction. For instance, the surface of the region that comes into contact with a target material is reacted with the target material to form an alloy or a compound. The alloy or the compound is entrained into the target material. As a result, a material (an alloy or a compound) that has been chemically reacted with the surface of the region is entrained into the target material as a particle, and a nozzle is clogged with the particle disadvantageously. The corrosion resistance property means that the surface of the region that comes into contact with the target material is less chemically reacted with the target material.

To achieve an erosion resistance property, it is necessary that the surface of the region that comes into contact with the target material is hard and a surface roughness is small to be a prescribed surface roughness. For instance, it is preferable that the prescribed surface roughness is specified in such a manner that a diameter of a particle generated in the specific region is 1 micron meter or less. This is because a particle having a diameter of 1 micron meter or less does not cause the clogging of a nozzle (having a diameter of 6 micron meter for instance) of a target generating unit. The specific region is polished by any one of a chemical polishing, an electrolytic polishing, a barrel polishing, a magnetic polishing, and a physical polishing, or a combination thereof to obtain the prescribed surface roughness.

When a specific region is produced, the specific region is polished to have a prescribed surface roughness. In the case in which the specific region is worn by using the target generating unit, the specific region is polished again to have a prescribed surface roughness. Moreover, the specific region can also be polished on a periodic basis according to an operating time of the target generating unit in such a manner that the specific region has a prescribed surface roughness.

For instance, the target material consists chiefly of tin, and the specific region is a region that may potentially come into contact with tin in a molten state.

The specific region can also be provided with a plurality of regions having different configurations associated with the erosion resistance property.

The specific region can also be provided with a first region in which a surface part that comes into contact with the target material is formed by a prescribed material for a surface and a second region in which the entire of a substrate part including the surface part is formed by a prescribed material for a substrate.

The specific region can also be provided with a region that is formed on a flat surface part and a region that is formed on a surface part having concavity and convexity.

The specific region can also be coated by a prescribed material for a surface.

The substrate part including the specific region can also be formed by a prescribed material for a substrate.

The prescribed region can also be coated by a prescribed material for a surface in the case in which a surface treatment can be relatively easily carried out for the prescribed region, and the substrate part including the prescribed region can also be formed by a prescribed material for a substrate in the case in which a surface treatment cannot be relatively easily carried out for the prescribed region.

The prescribed material for a surface can also contain at least one of a metal nitride, a metal oxide, metal carbide, molybdenum, tungsten, ceramics, titanium, a diamond, a carbon graphite, and quartz. In this case, a substrate material can also be made of a stainless steel or a carbon steel.

The prescribed material for a substrate can also contain at least one of a crystal that consists chiefly of molybdenum, a crystal that consists chiefly of titanium, a crystal that consists chiefly of tantalum, a crystal that consists chiefly of a diamond, a crystal that consists chiefly of a carbon steel, and a crystal that consists chiefly of alumina.

ADVANTAGEOUS EFFECTS OF INVENTION

By the present invention, a prescribed region that comes into contact with a target material is provided with an erosion resistance property and a corrosion resistance property to the target material. Consequently, the target generating unit can be suppressed from being physically eroded and being chemically corroded by the target material. As a result, a performance of the target generating unit can be prevented from being degraded. Moreover, the target generating unit can be prevented from being clogged by specifying the prescribed region to have a prescribed surface roughness for achieving the erosion resistance property.

By the present invention, only a surface that comes into contact with the target material can be coated with a prescribed material for a surface and/or the entire of a substrate part including the surface that comes into contact with the target material can be formed by a prescribed material for a substrate. Consequently, a prescribed region that comes into contact with a target material can be provided with an erosion resistance property and a corrosion resistance property to the target material by a suitable method based on a processability of a surface treatment for instance.

MODE FOR CARRYING OUT THE INVENTION

A mode for the present invention will be described below in detail with reference to the drawings. In the mode for the present invention, a prescribed region that comes into contact with the target material is provided with an erosion resistance property and a corrosion resistance property to the target material as described below. For instance, in a target generating unit, a target material collecting device, and a target material supply device, a region that comes into contact with the target material in a molten state is provided with an erosion resistance property and a corrosion resistance property.

Embodiment 1

Figure 1:
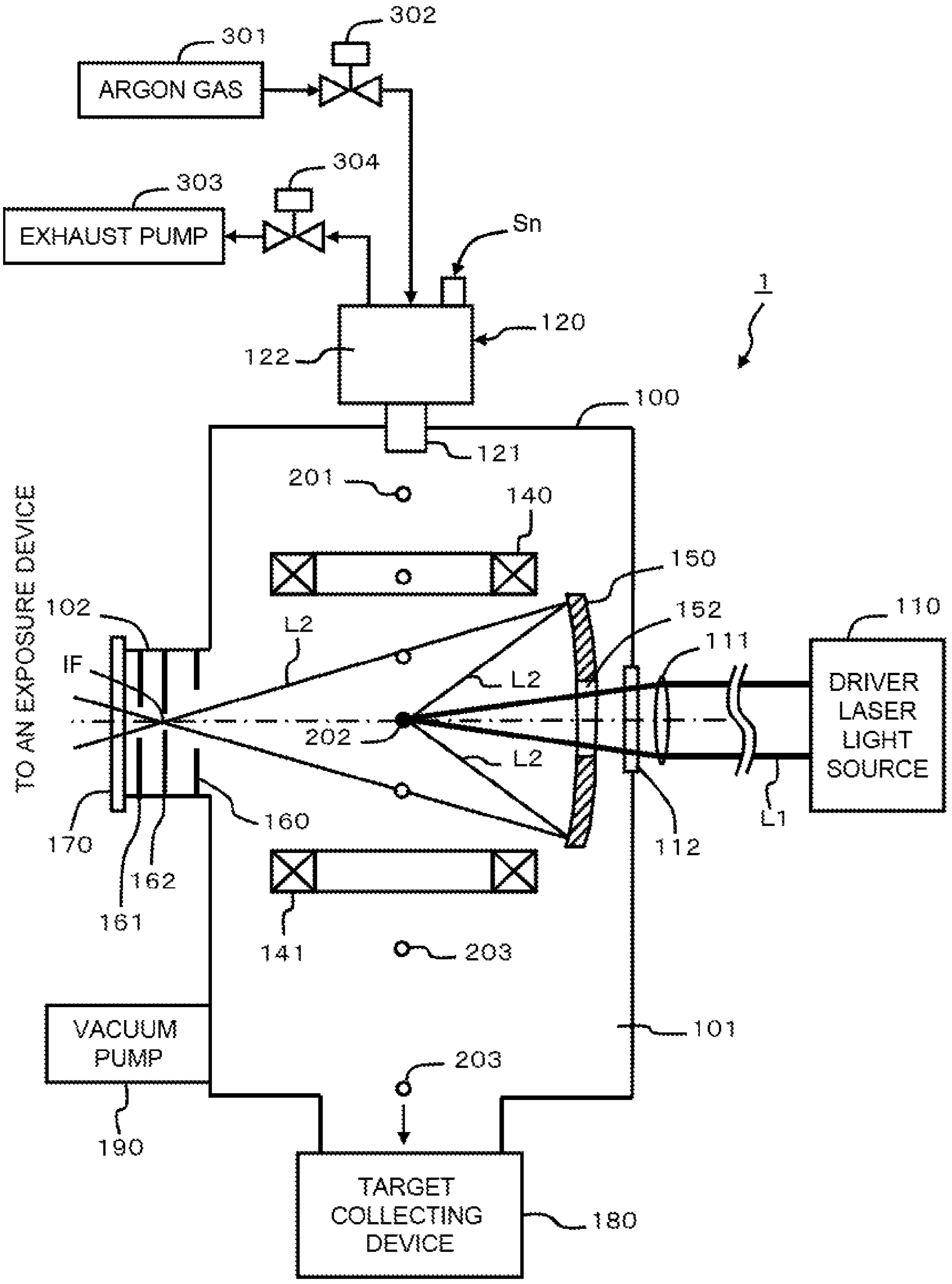
FIG. 1 is a block diagram showing an extreme ultraviolet light source device in accordance with a first embodiment of the present invention.

A first embodiment of the present invention will be described in the following with reference to FIGS. 1 to 3. FIG. 1 is an explanatory diagram showing a general configuration of an EUV light source device 1. The EUV light source device 1 can be configured to be provided with, for example, a vacuum chamber 100, a driver laser light source device 110, a target generating unit 120, magnetic field generating coils 140 and 141, an EUV light collector mirror 150, bulkhead apertures 160 and 161, a gate valve 170, and a vacuum pump 190.

The vacuum chamber 100 can be configured by connecting a first chamber 101 having a large volumetric capacity and a second chamber 102 having a small volumetric capacity. The first chamber 101 is a main chamber that carries out a generation of plasma and so on. The second chamber 102 is a connecting chamber that supplies an EUV light that is emitted from plasma to an exposure device not shown.

A vacuum pump 190 is connected to the first chamber 101. By this configuration, the vacuum chamber 100 can be maintained to be in a vacuum state. Moreover, the second chamber 102 can also be configured to be provided with another vacuum pump. In that case, debris can be suppressed from flowing to the exposure device side by setting a pressure in the first chamber 101 to be less than a pressure in the second chamber 102.

The target generating unit 120 heats and melts a material such as tin (Sn), and supplies a target 201 as a droplet in a state of solid or liquid. The target generating unit 120 can be configured to be provided with a nozzle part 121 and a tank part 122.

Tin as a target material is supplied from an external part to the tank part 122. The tank part 122 can be configured to be provided with a heating device 124 such as a heater (see FIG. 2) and can heat tin to be in a molten state. An argon gas tank 301 is connected to the tank part 122 via a valve 302 for instance.

An argon gas is used as a blowout gas that makes a target blow out from the nozzle part 121. In the case in which the valve 302 is opened, an argon gas is supplied into the tank part 122. Tin in a molten state in the tank part 122 is made blow out from the nozzle part 121 into the chamber 100 due to a pressure of the argon gas. As described later, a vibration is applied in a continuous manner to tin that is made blow out as a jet stream from the nozzle part 121 whereby a droplet 201 made of tin can be generated. As a blowout gas, not only an argon gas but also another inert gas that absorbs less EUV lights L2 can be used.

An exhaust pump 303 is connected to the tank part 122 via a valve 304. In the case in which an air release is carried out for the purpose of supplying tin to the tank part 122, a valve 304 is opened and the exhaust pump 303 is operated. By this step, an air in the tank part 122 is exhausted, thereby preventing tin from being oxidized in heating tin.

A driver laser light source 110 outputs a driver laser beam L1 that excites the target 201 that is supplied from the target generating unit 120. The driver laser light source 110 can be configured as a CO2 (carbon dioxide gas) pulse laser light source for instance.

The driver laser light source 110 emits a driver laser beam L1 having the specifications of a wavelength of 10.6 μm, an output power of 20 kW, a pulse repetition rate of 100 kHz, and a pulse width of 20 nsec. In the present embodiment, a CO2 pulse laser is described for example as a laser light source. However, a laser light source of the present invention is not limited to the CO2 pulse laser.

The driver laser beam L1 that is output from the driver laser light source 110 for an excitation is incident to the first chamber 101 via a light focusing lens 111 and an incident window 112. The driver laser beam L1 that has been incident to the first chamber 101 passes through an incident hole 152 formed in an EUV light collector mirror 150, and a target 201 is irradiated with the driver laser beam L1.

In the case in which a target 201 is irradiated with the driver laser beam L1, the tin target 201 is changed to a target plasma 202. Hereafter, a target plasma 202 is simply referred to as a plasma 202 as a matter of practical convenience. The plasma 202 emits an EUV light L2 having a center wavelength of 13.5 nm. The EUV light L2 that has been emitted from the plasma 202 is incident to the EUV light collector mirror 150 and reflected by the EUV light collector mirror 150. The EUV light L2 that has been reflected by the EUV light collector mirror 150 is focused at a position of an intermediate light focusing point (IF: Intermediate Focus) in the second chamber 102. The EUV light L2 that has been focused to the IF is guided to an exposure device via a gate valve 170 in an open state.

A pair of magnetic field generating coils 140 and 141 is disposed in such a manner that a light path of the EUV light L2 traveling from the plasma 202 to the IF via the EUV light collector mirror 150 is sandwiched between the magnetic field generating coils 140 and 141. The shaft centers of the magnetic field generating coils 140 and 141 are corresponded to each other. The magnetic field generating coils 140 and 141 can be configured to be an electromagnet provided with a superconducting coil for instance. In the case in which an electric current is flown in the same direction to each of the magnetic field generating coils 140 and 141, a magnetic field is generated. The magnetic field is generated in the vertical direction of FIG. 1. A magnetic flux density is higher around the magnetic field generating coils 140 and 141, and a magnetic flux density is lower at an intermediate point of the magnetic field generating coils 140 and 141.

In the case in which the target 201 is irradiated with the driver laser beam L1, debris is generated. The electrically charged debris (an ion such as plasma) is trapped by a magnetic field that is generated by each of the magnetic field generating coils 140 and 141. The electrically charged debris is moved in a spiral pattern due to Lorentz force toward the lower side of FIG. 1, and is collected by a target collecting device 180.

The installation location of the magnetic field generating coils 140 and 141 can be a location in which ionic debris is prevented from reaching the surface of the EUV light collector mirror 150 and is output due to a magnetic line of force that is generated by the magnetic field generating coils 140 and 141.

Among a large number of targets 201 that have been generated by the target generating unit 120, a target that has not been irradiated with the driver laser beam L1 is also collected by a target collecting device 180. In FIG. 1, an unused target is numbered as 203.

A reason of a generation of the unused target 203 will be described below. A target that is not irradiated with the driver laser beam L1 (the unused target 203) is intentionally input in some cases in order to prevent debris from affecting the next target 203.

As another reason, a repetition rate of the driver laser beam L1 and a rate for stably generating a target 201 having a desired diameter are not corresponded to each other in some cases. In this case, a generating rate of a target 201 is specified to be the integral multiple of a repetition rate of the driver laser beam L1. By this step, a generation of the target 201 and an irradiation of the driver laser beam L1 are synchronized with each other. In the description of the present embodiment, a generating cycle of the target (a droplet) 201 is synchronized with a double of a repetition cycle of the driver laser beam L1.

For instance, in the case in which the target 201 of ϕ tens of μm is irradiated with the driver laser beam L1 of 100 kHz, a target generating rate is 200 kHz, and targets 201 of at least 90% of a large number of targets 201 blown out from the target generating unit 120 are not irradiated with the driver laser beam L1 and become unused targets 203.

In the description of the present embodiment, the target collecting device 180 is disposed at the bottom of the first chamber 101 to collect an unused target 203. The collected unused target 203 is then supplied to the target generating unit 120 to be recycled.

Two bulkhead apertures 160 and 161 and an IF aperture 162 are disposed in the vicinity of the IF. The IF aperture 162 is disposed at the position of the IF, and is formed to be larger than an IF image to a certain degree. A first bulkhead aperture 160 is disposed on the front side of the IF, and a second bulkhead aperture 161 is disposed on the rear side of the IF in a traveling direction of the EUV light L2 that has been reflected by the EUV light collector mirror 150. The IF aperture 162 is disposed between the bulkhead apertures 160 and 161. The bulkhead apertures 160 and 161 are provided with an opening part in the range of several mm to 10 mm for instance. Moreover, a diameter of the IF aperture 162 is approximately several mm.

The first bulkhead aperture 160 is disposed close to the location in which the first chamber 101 and the second chamber 102 are connected to each other. The second bulkhead aperture 161 is disposed close to the location in which the second chamber 102 and an exposure device are connected to each other.

In other words, the IF is configured to be located in the second chamber 102 other than the first chamber 101, and the bulkhead apertures 160 and 161 are disposed in such a manner that a partition is formed in the vicinity of the IF.

An SPF (Spectrum Purity Filter) can also be formed on any one or both of the front side and the rear side of the IF to block a light having a wavelength other than 13.5 nm.

Figure 2:
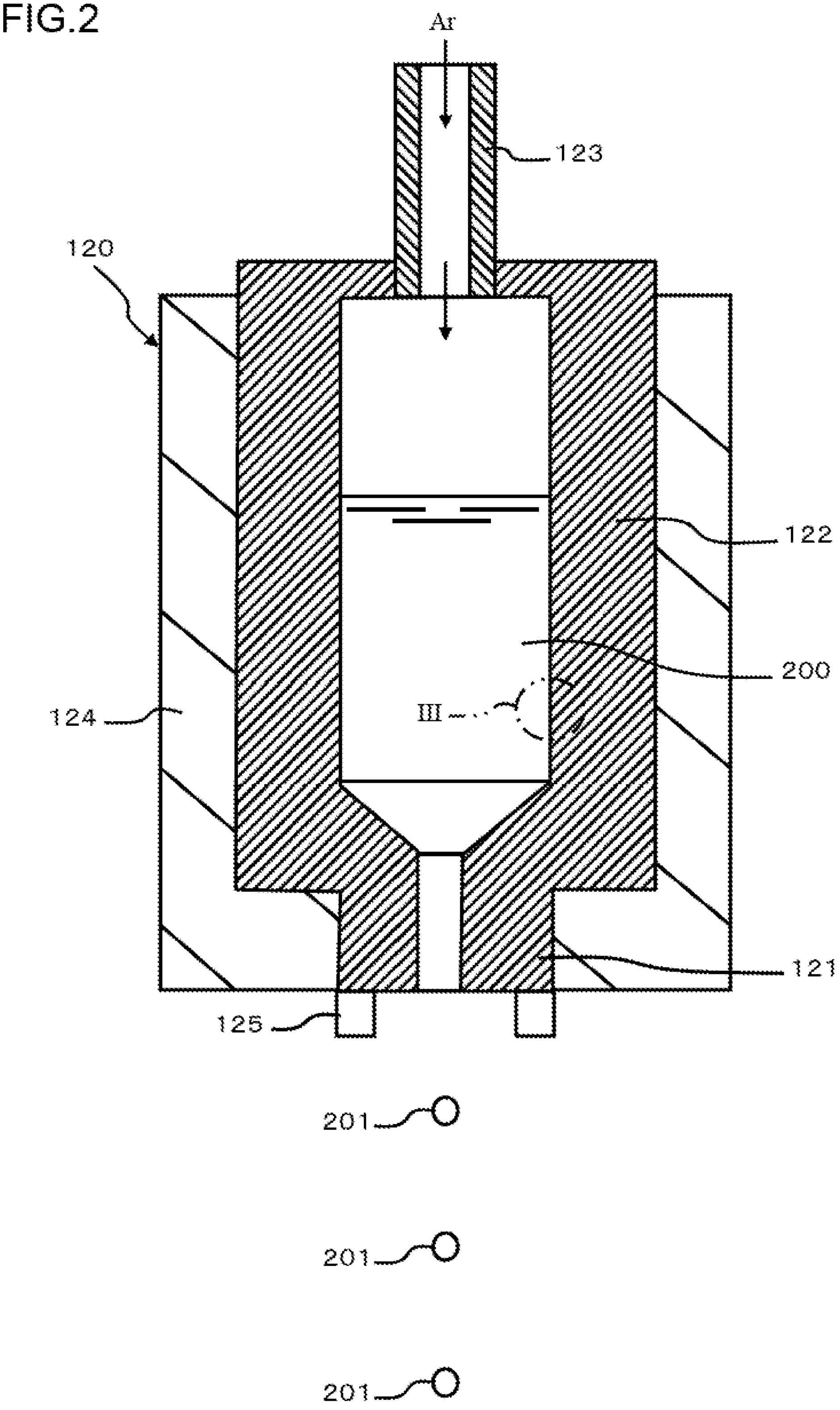
FIG. 2 is an enlarged cross-sectional view showing a nozzle part.

FIG. 2 is an enlarged cross-sectional view showing the target generating unit 120. A gas inflow port 123 is formed on the upper section of the tank part 122 that is configured as a high-pressure tank. The gas inflow port 123 is connected to the argon gas tank 301 via the valve 302. An argon gas flows from the gas inflow port 123 into the tank part 122, and pressurizes tin in a molten state that is a target material 200. By this step, tin in a molten state is forced out of the nozzle part 121.

A heating device 124 is disposed on the periphery of the tank part 122 and the nozzle part 121. The heating device 124 is provided with a heating source such as a heater and a temperature controller that adjusts an amount of heat generation of the heating source corresponding to a detection signal from a temperature sensor. The heating device 124 heats tin in the target generating unit 120 to be a temperature in the range of 230° C. to 400° C. to make tin in a molten state.

A vibration generating unit 125 is formed around an injection port of the nozzle part 121. The vibration generating unit 125 can be configured to be provided with a vibration generating element such as a piezo element. The nozzle part 121 vibrates by an operation of the vibration generating unit 125. In the case in which a tin jet in the form of a liquid (not shown) is injected while the nozzle part 121 vibrates, a target 201 in the form of a droplet is generated.

Figure 3:
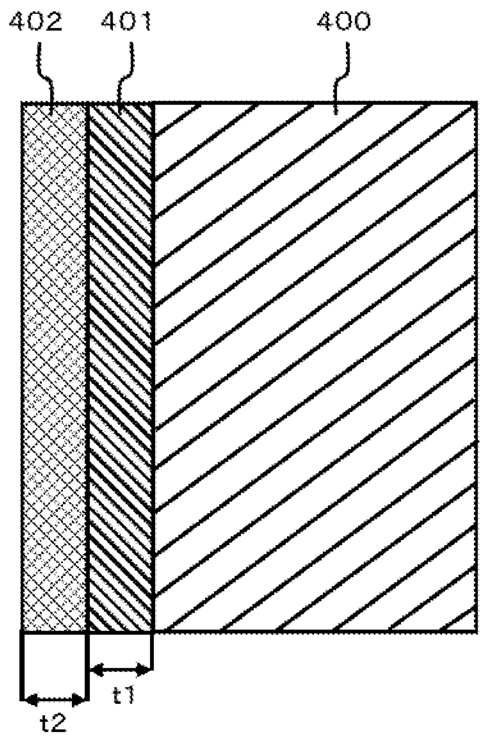
FIG. 3 is an enlarged cross-sectional view showing a part of a nozzle part.

FIG. 3 is an enlarged cross-sectional view showing a part of FIG. 2 (for instance, a region shown by III in FIG. 2). The target generating unit 120 can be configured to be provided with a substrate part 400 and a plurality of layers 401 and 402 that are formed on the inner surface side of the substrate part 400.

The substrate part 400 is made of, for example, a stainless steel, molybdenum (Mo), titanium (Ti), or tantalum (Ta). In the case in which the target generating unit 120 is not in a high magnetic field, a carbon steel can also be used as a material of the substrate part 400. The substrate part 400 can also be called a base material part. Moreover, the entire of the substrate part 400 can also be made of molybdenum.

The inner surface of the substrate part 400 comes into contact with tin. A first protective layer 401 is formed on the inner surface of the substrate part 400. A second protective layer 402 is formed in such a manner that the second protective layer 402 covers the first protective layer 401. For instance, the first protective layer 401 is a metal nitride layer such as a chromium nitride layer, which has a hard characteristic. The second protective layer 402 is a metal oxide layer, which has a function for suppressing a corrosion caused by tin. The second protective layer 402 can be formed by oxidizing the surface of the first protective layer 401.

The first protective layer 401 can be formed to have a thickness t1 in the range of more than a dozen μm to a hundred and several tens of μm. A thickness t2 of the second protective layer 402 is specified to be smaller than a thickness t1 of the first protective layer 401. In the illustration of FIG. 3, a thickness of the first protective layer 401 is almost equivalent to that of the second protective layer 402 as a matter of practical convenience.

As a material of the first protective layer 401, a metal nitride, molybdenum, tungsten (W), carbide, alumina ceramics (Al2O3), a diamond, titanium, a carbon graphite, and quartz can be used for instance. In the case of a material that is easily oxidized among the above materials, the second protective layer 402 can be formed in the course of nature. In the case of a material that is hard to be oxidized, the material is provided with both of a mechanical strength and an erosion resistance property to tin.

The first protective layer 401 (or the second protective layer 402) is specified to have a prescribed surface roughness in such a manner that a diameter of a particle that can be generated in the first protective layer 401 is 1 micron meter or less. The surface of the first protective layer 401 is polished by any one of a chemical polishing, an electrolytic polishing, a barrel polishing, a magnetic polishing, and a physical polishing, or a combination thereof to achieve the prescribed surface roughness. In the case in which the surface of the first protective layer 401 is polished to have a prescribed surface roughness, the second protective layer 402 that is an oxide film can have a prescribed surface roughness.

Each of the above polishing methods will be described in the following. A chemical polishing is a method for chemically polishing a surface in acid or an alkaline solution. An electrolytic polishing is a method for removing a burr on a surface of an object to be polished by making an electrolytic solution flow between an electrode of the object to be polished on a plus side and an electrode on a minus side opposite to the object to be polished for a current conduction. A barrel polishing is a method in which an object to be polished, a polishing stone, and a compound solution are mixed at a prescribed ratio and filled into a polishing bath called a barrel bath, and the object is polished by using a difference in relative movements in the polishing bath. A magnetic polishing is a method in which the magnetic media and an object to be polished are input to a polishing bath and the magnetic media is moved by a magnetic field to polish the object to be polished.

In the present embodiment that is configured as described above, since a metal oxide layer 402 is formed on the inner wall of the target generating unit 120, even in the case in which a target is made blow out for a long period of time, the inner wall can be suppressed from being eroded and corroded by tin in a molten state. As a result, the nozzle part 121 can be prevented from being clogged by impurities. Consequently, the target 201 in a stable shape can be made blow out in an accurate direction at a stable speed, and a droplet can be supplied at a desired position of an EUV luminous point and at a desired timing. Therefore, in the present embodiment, a performance of the extreme ultraviolet light source device can be prevented from being degraded, and a reliability of the extreme ultraviolet light source device can be improved.

Moreover, in the present embodiment, the first protective layer 401 (or the second protective layer 402) is specified to have a prescribed surface roughness in such a manner that a diameter of a particle that can be generated in the first protective layer 401 is 1 micron meter or less, whereby a size of a particle can be controlled. Consequently, even in the case in which a particle is generated, the nozzle part 121 can be prevented from being clogged by the particle before happens, whereby a stability of a droplet supply and a reliability of the extreme ultraviolet light source device can be improved. In each of embodiments described later, it is preferable that a degree of roughness of a surface that comes into contact with a target material is controlled to be a prescribed value.

More specifically, a surface roughness (a surface roughness degree) of a region that comes into contact with a target material is specified to be a value of 1/10 or less of a diameter of a nozzle that emits a target material. By this configuration, the nozzle can be prevented from being clogged, and a stability of a target material that is output from the nozzle can be improved. For instance, in the case in which a diameter of a nozzle is 10 μm, a surface roughness Ra is specified to be 1 μm or less. Moreover, by specifying a surface roughness to be 1/100 or less of a diameter of a nozzle (for instance, Ra=0.10 μm), a target stability can be obtained with a higher degree of accuracy.

Embodiment 2

Figure 4:
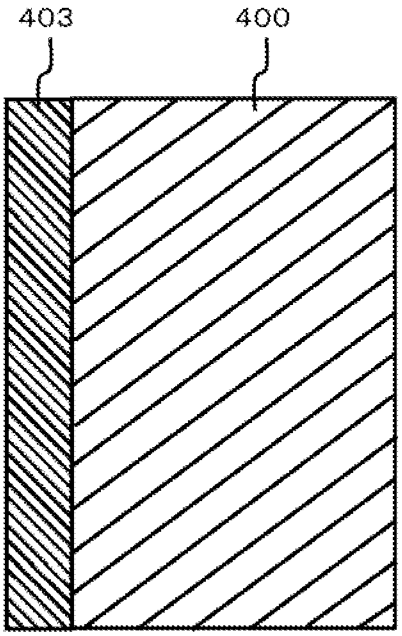
FIG. 4 is a cross-sectional view showing a part of a nozzle part in accordance with a second embodiment of the present invention.

A second embodiment of the present invention will be described in the following with reference to FIG. 4. Each embodiment that will be described in the following corresponds to a modified example of the first embodiment. Consequently, some points that are different from the first embodiment will be described mainly.

In the present embodiment, only one protective layer 403 is formed on the inner surface of the substrate part 400. The protective layer 403 made of a material such as a diamond, molybdenum, titanium, tungsten, a metal nitride, carbide, alumina ceramics, a carbon graphite, and quartz, which are provided with an erosion resistance property to tin. The present embodiment that is configured as described above has an operation effect equivalent to that of the first embodiment.

Embodiment 3

Figure 5:
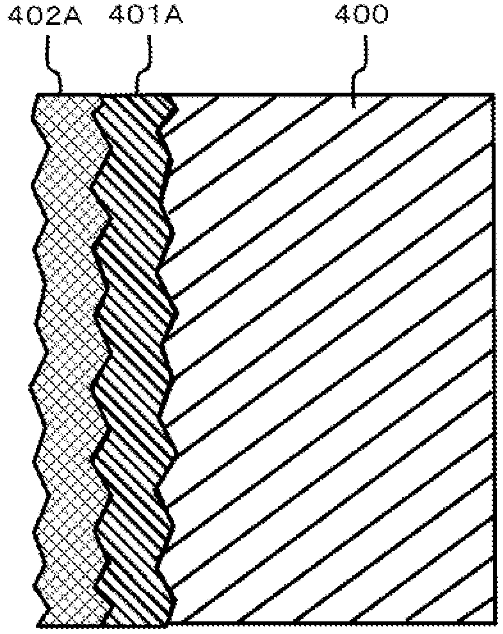
FIG. 5 is a cross-sectional view showing a part of a nozzle part in accordance with a third embodiment of the present invention.

A third embodiment of the present invention will be described in the following with reference to FIG. 5. In the present embodiment, after the inner surface of the substrate part 400 is roughened by a processing such as a shot blasting, a first protective layer 401A and a second protective layer 402A are formed.

Since the first protective layer 401A and the second protective layer 402A are formed on the inner surface that has been roughened, the layers 401A and 402A also have a roughened surface having concavity and convexity. By this configuration, tin can be prevented from adhering to the surface of the second protective layer 402A. The present embodiment that is configured as described above has an operation effect equivalent to that of the first embodiment.

Embodiment 4

Figure 6:
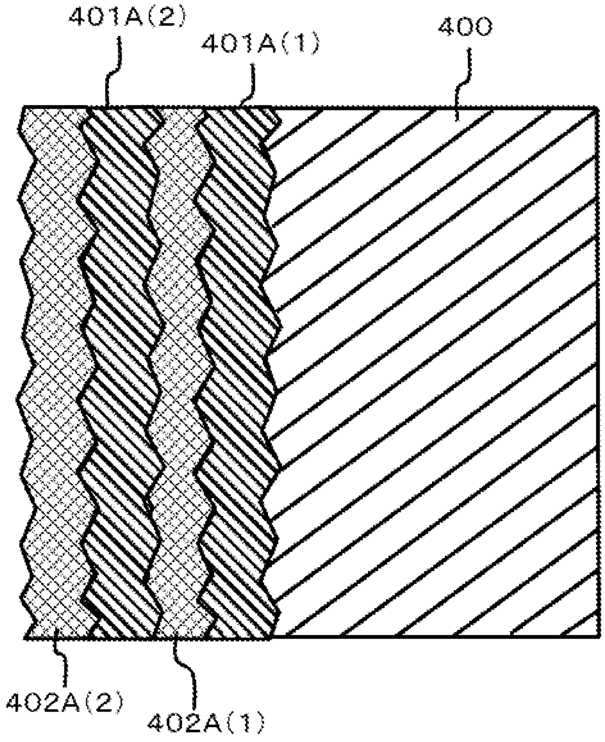
FIG. 6 is a cross-sectional view showing a part of a nozzle part in accordance with a fourth embodiment of the present invention.

A fourth embodiment of the present invention will be described in the following with reference to FIG. 6. In the present embodiment, the inner surface of the substrate part 400 is roughened, and two sets of a pair of a first protective layer 401A and a second protective layer 402A are formed. More specifically, a first protective layer 401A (1) and a second protective layer 402A (1) are formed on the roughened inner surface of the substrate part 400, and the other first protective layer 401A (2) and the other second protective layer 402A (2) are formed on the layers 401A (1) and 402A (1).

In the present embodiment that is configured as described above, since a plurality of pairs of a first protective layer 401A and a second protective layer 402A are formed, an erosion caused by tin can be suppressed for a longer period of time, and a reliability of the extreme ultraviolet light source device can be further improved. Moreover, three sets or more of a pair of a first protective layer 401A and a second protective layer 402A can also be formed.

Embodiment 5

Figure 7:
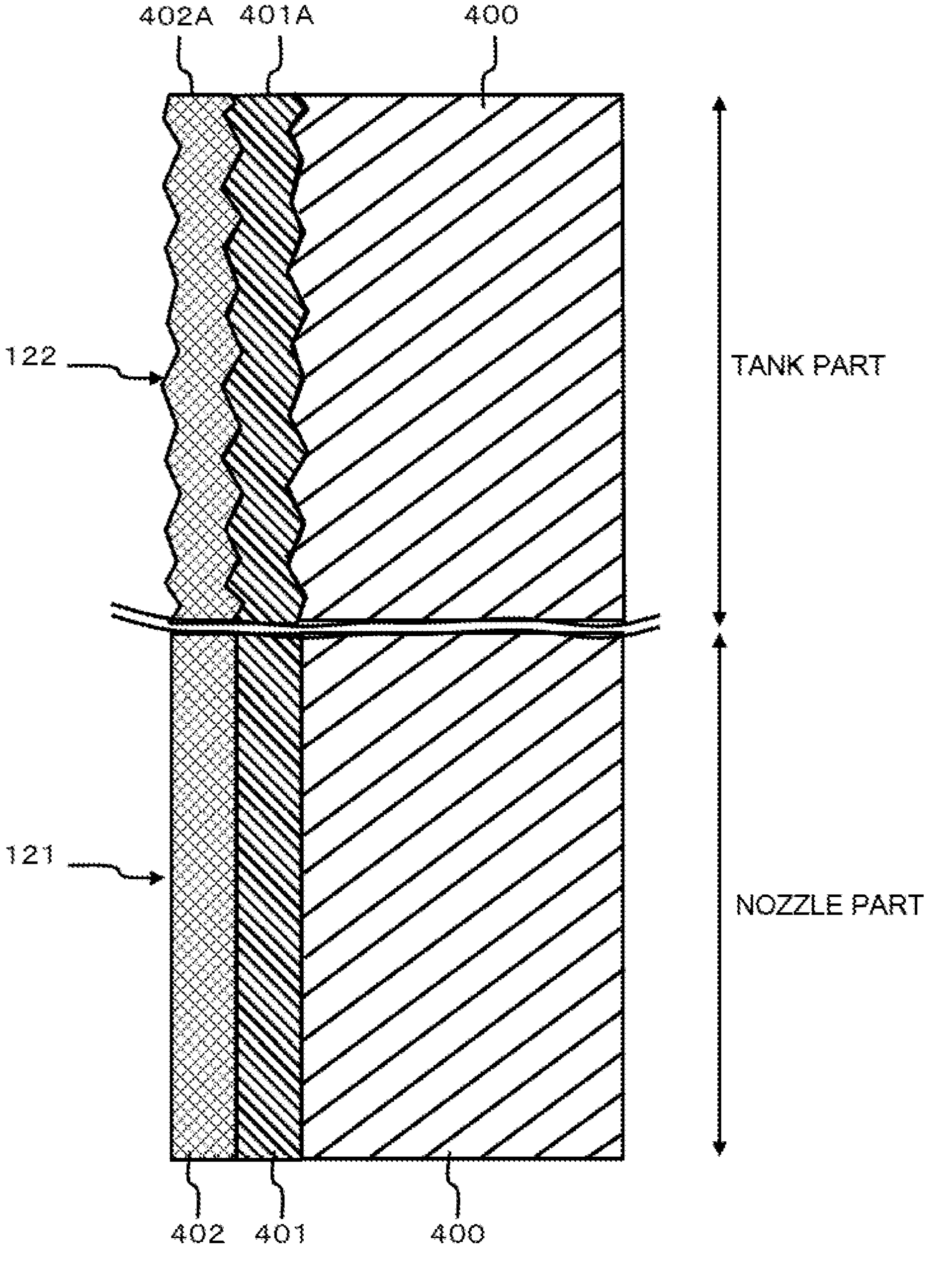
FIG. 7 is a cross-sectional view showing a part of a nozzle part in accordance with a fifth embodiment of the present invention.

A fifth embodiment of the present invention will be described in the following with reference to FIG. 7. In the present embodiment, the tank part 122 and the nozzle part 121 have different configurations associated with an erosion resistance property. For the tank part 122, as described in FIG. 5, the inner surface of the substrate part 400 is roughened, and a first protective layer 401A and a second protective layer 402A are formed. On the other hand, for the nozzle part 121, as described in FIG. 3, a first protective layer 401 and a second protective layer 402 are formed on the flat inner surface of the substrate part 400.

The present embodiment that is configured as described above has an operation effect equivalent to that of the first embodiment. Moreover, in the present embodiment, the first protective layer 401A and the second protective layer 402A that protect the inner surface of the tank part 122 are roughened, and the first protective layer 401 and the second protective layer 402 that protect the inner surface of the nozzle part 121 are formed in an even pattern. Consequently, a solidified particle that has been reacted with tin can be prevented from reaching the nozzle part. As a result, for the nozzle part 121, a direction and a speed of an injection of a target 201 can be stabilized.

Embodiment 6

Figure 8:
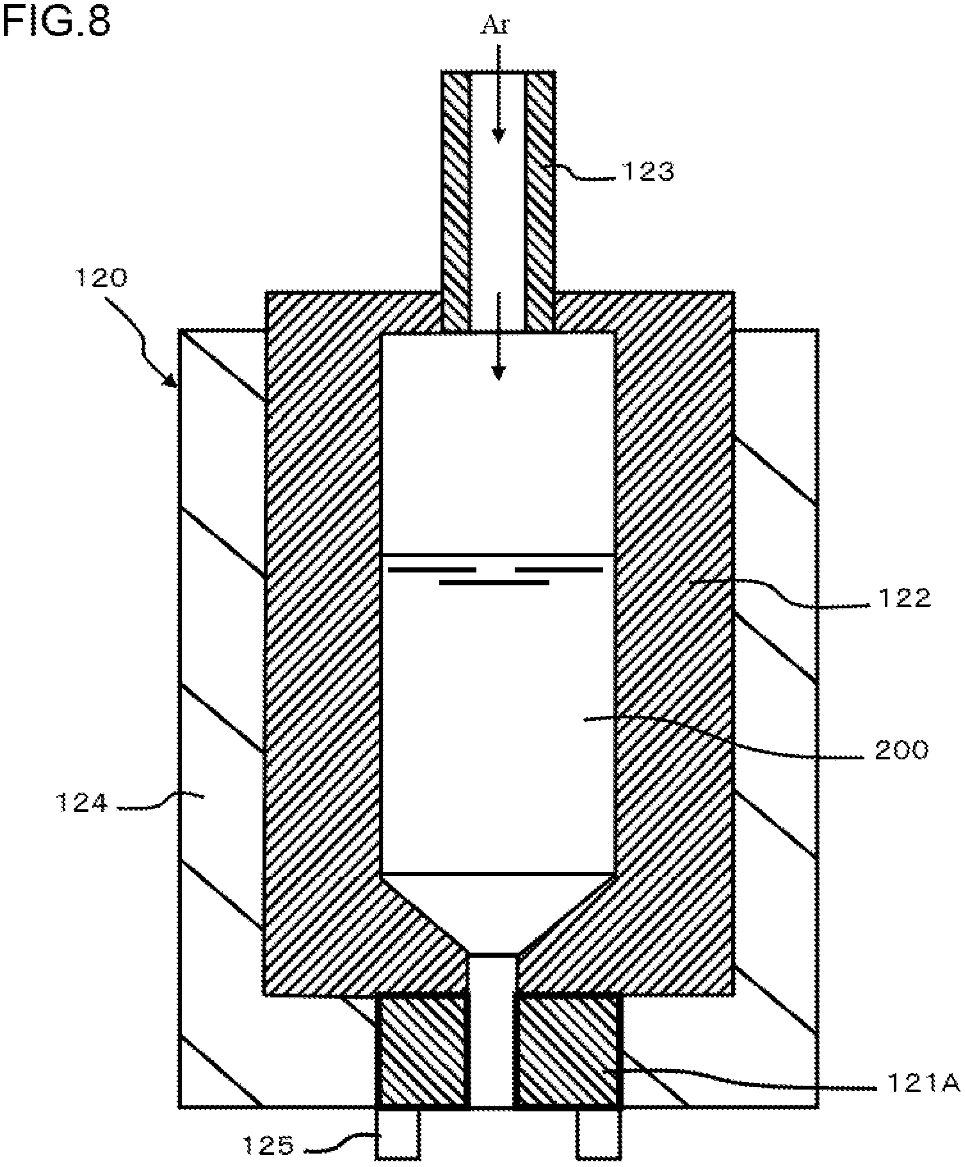
FIG. 8 is an enlarged cross-sectional view showing a nozzle part in accordance with a sixth embodiment of the present invention.

A sixth embodiment of the present invention will be described in the following with reference to FIGS. 8 and 9. In the present embodiment, the tank part 122 and the nozzle part 121A are formed as separate members. FIG. 8 is a cross-sectional view showing a configuration of the target generating unit 120. The nozzle part 121A is formed as a member separate from the tank part 122, and is fixed to the bottom face of the tank part 122 by a fixing means such as a welding. Moreover, the contact surface of the nozzle part 121A and the tank part 122 can also be processed in such a manner that a surface roughness becomes small, and the both parts can be made come into contact with each other by being pressed from the outside to be fixed to each other.

Figure 9:
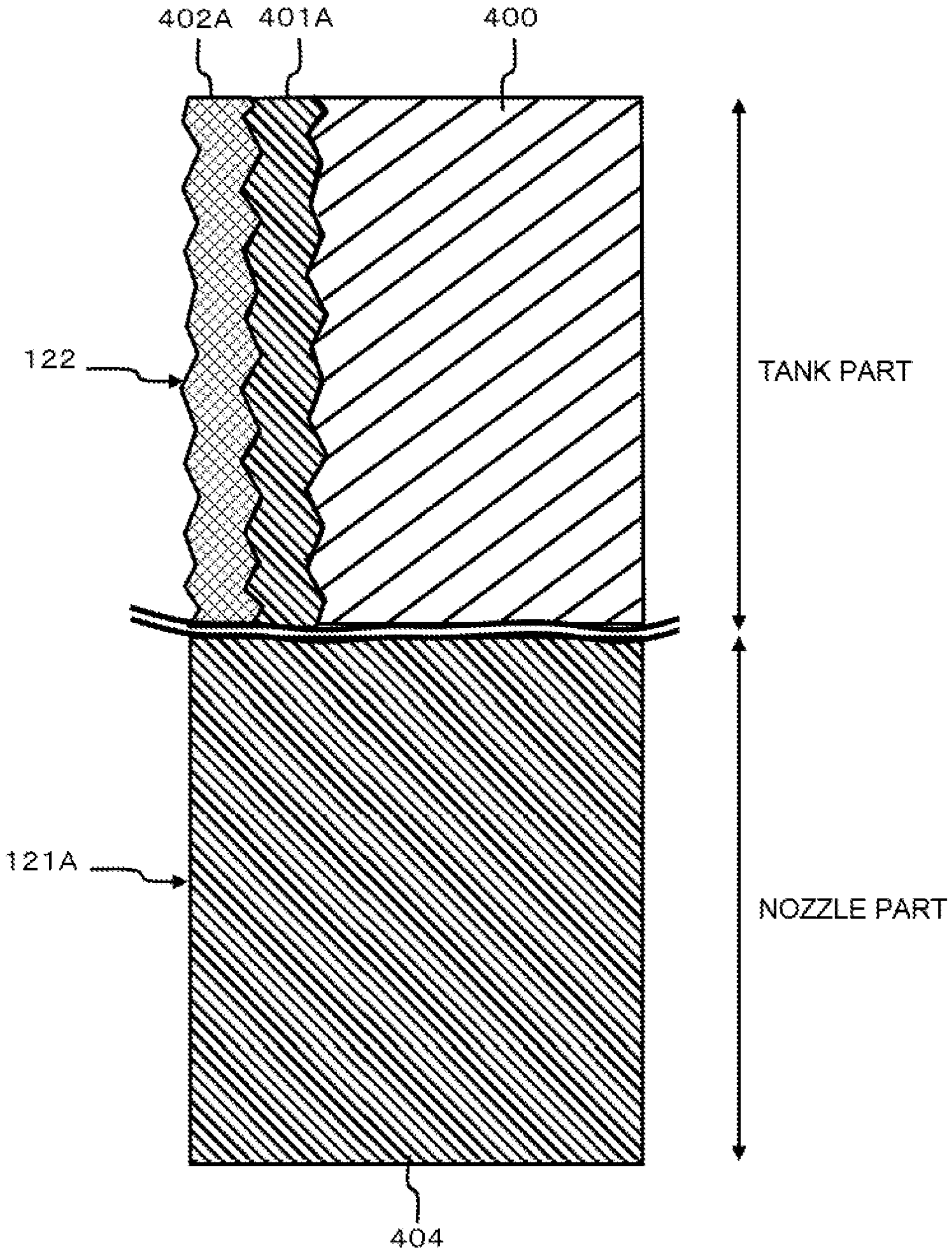
FIG. 9 is a cross-sectional view showing a configuration of a nozzle part.

FIG. 9 is a cross-sectional view showing a configuration of the nozzle part 121A and the tank part 122. As described in FIG. 5, for the tank part 122, the inner surface of the substrate part 400 is roughened, and a first protective layer 401A and a second protective layer 402A are formed on the substrate part 400.

On the other hand, the substrate part 404 of the nozzle part 121A is made of a material such as a crystal that consists chiefly of molybdenum, a crystal that consists chiefly of titanium, a crystal that consists chiefly of tungsten, a crystal that consists chiefly of a diamond, a crystal that consists chiefly of a metal nitride, a crystal that consists chiefly of carbide, a crystal that consists chiefly of alumina ceramics, a crystal that consists chiefly of a carbon graphite, a crystal that consists chiefly of quartz, and a crystal that consists chiefly of alumina, which are provided with an erosion resistance property and a corrosion resistance property to tin, a pressure resistance property, and a heat resistance property. As an example of a crystal that consists chiefly of alumina, a crystal of ruby and a crystal of sapphire can be mentioned for instance.

The present embodiment that is configured as described above has an operation effect equivalent to that of the first embodiment. Moreover, in the present embodiment, the nozzle part 121A is formed as a member separate from the tank part 122, and the nozzle part 121A and the tank part 122 are configured to be provided with an erosion resistance property and a corrosion resistance property to tin according to separate methods. Consequently, the minute nozzle part 121A to which a surface treatment is relatively hard to be carried out can be provided with an erosion resistance property to tin to a satisfactory extent.

Embodiment 7

Figure 10:
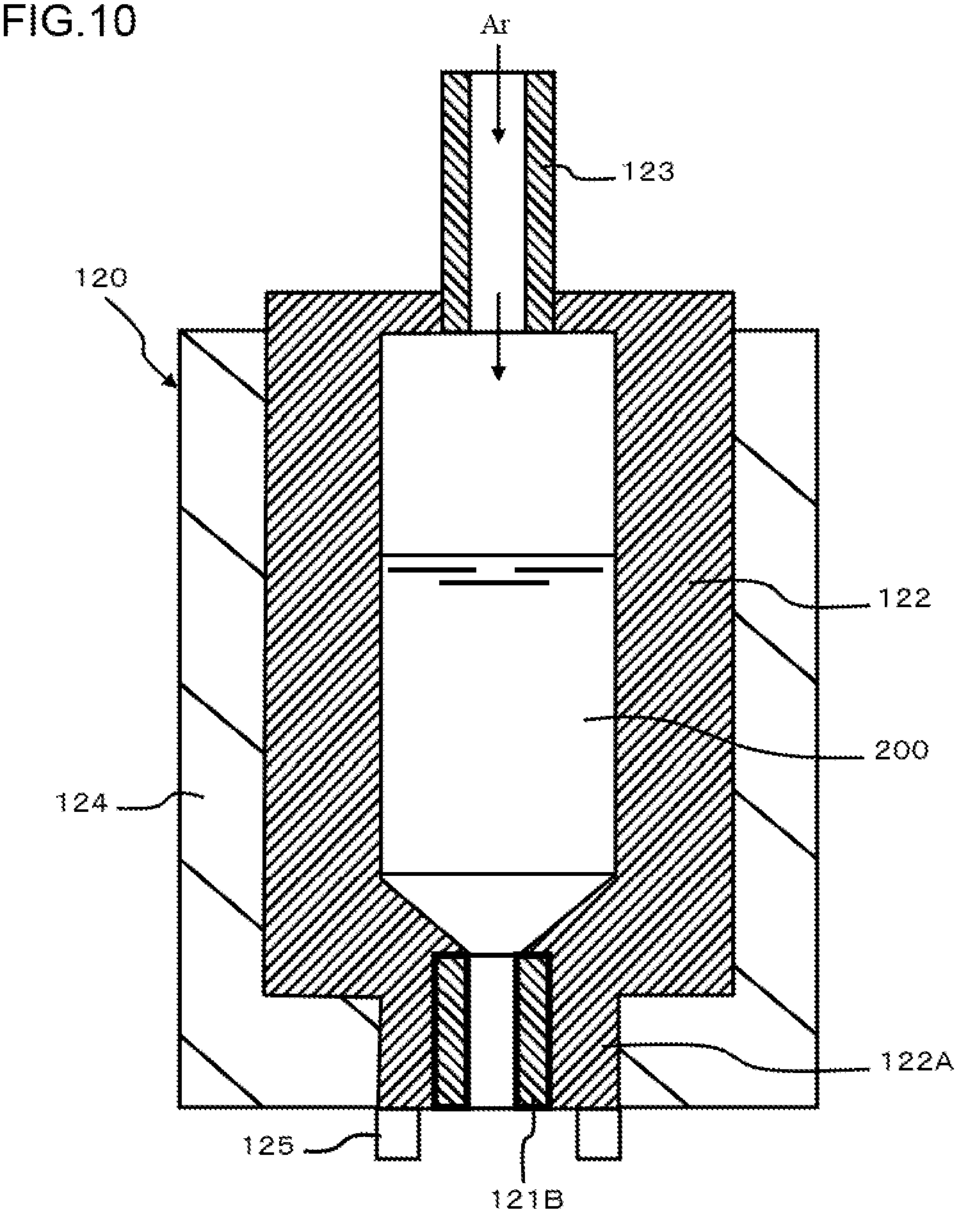
FIG. 10 is an enlarged cross-sectional view showing a nozzle part in accordance with a seventh embodiment of the present invention.

A seventh embodiment of the present invention will be described in the following with reference to FIG. 10. In the present embodiment, a nozzle holder 122A is formed on the leading end side of the tank part 122, and the nozzle part 121B is mounted into the nozzle holder 122A.

A first protective layer 401 and a second protective layer 402 are formed on the inner surface of the tank part 122. The entire of the nozzle part 121B is made of a material provided with an erosion resistance property and a corrosion resistance property to tin, a pressure resistance property, and a heat resistance property.

The present embodiment that is configured as described above has an operation effect equivalent to that of the first and sixth embodiments. Moreover, in the present embodiment, a nozzle holder 122A is formed on the lower side of the tank part 122, and the nozzle part 121B is mounted to the nozzle holder 122A. Consequently, the nozzle part 121B can be formed to be smaller as compared with the sixth embodiment. By this configuration, a used amount of costly materials such as a crystal that consists chiefly of molybdenum, a crystal that consists chiefly of titanium, a crystal that consists chiefly of tungsten, a crystal that consists chiefly of a diamond, a crystal that consists chiefly of a metal nitride, a crystal that consists chiefly of carbide, a crystal that consists chiefly of alumina ceramics, a crystal that consists chiefly of a carbon graphite, a crystal that consists chiefly of quartz, and a crystal that consists chiefly of alumina can be less, thereby reducing a production cost.

Embodiment 8

Figure 11:
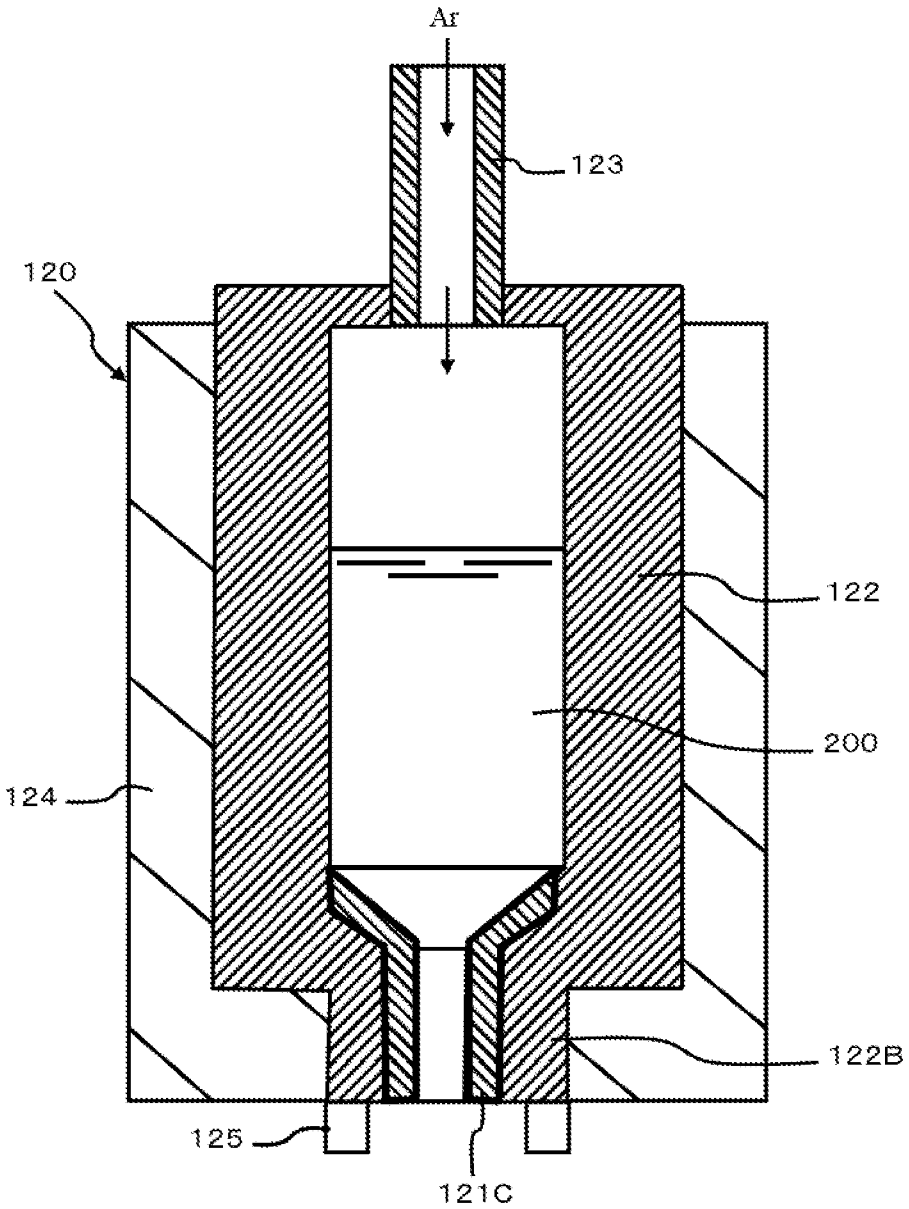
FIG. 11 is an enlarged cross-sectional view showing a nozzle part in accordance with an eighth embodiment of the present invention.

An eighth embodiment of the present invention will be described in the following with reference to FIG. 11. In the present embodiment, the nozzle part 121C in a funnel shape is mounted into the nozzle holder 122B that has been formed on the lower side of the tank part 122. The present embodiment that is configured as described above has an operation effect equivalent to that of the first, sixth, and seventh embodiments. Moreover, in the present embodiment, a region to which a surface treatment is relatively hard to be carried out in the tank part 122, that is, a part in a turned conical shape can be protected by the nozzle part 121C in a funnel shape.

Embodiment 9

Figure 12:
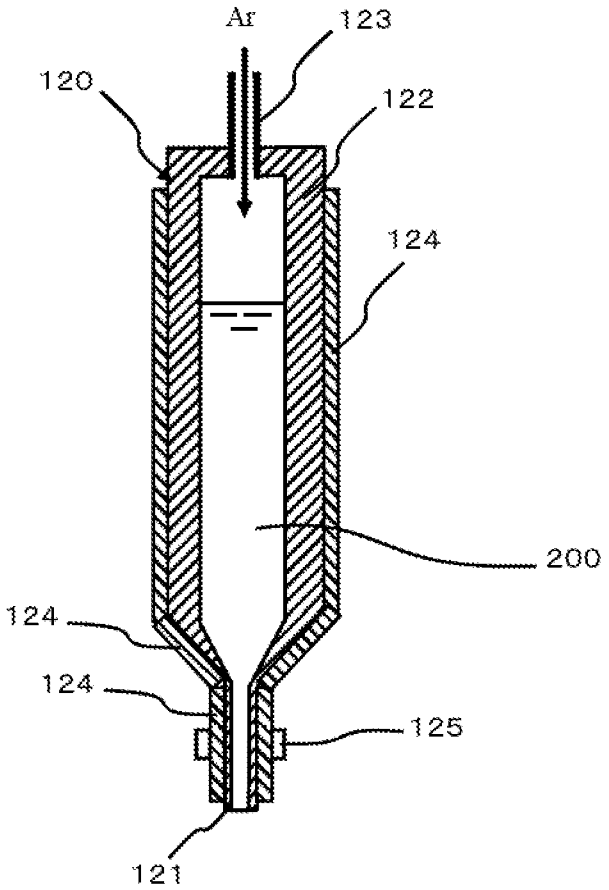
FIG. 12 is a cross-sectional view showing a target material supply device in accordance with a ninth embodiment of the present invention.

A ninth embodiment of the present invention will be described in the following with reference to FIG. 12. In the present embodiment, the target generating unit 120 is made of the same substrate. More specifically, the tank part 122 and the nozzle part 121 are made of the same substrate. A vibration generating unit 125 is disposed outside the nozzle part 121. A heating device 124 is disposed in such a manner that the heating device 124 covers the periphery of the tank part 122 and the nozzle part 121 that are made of the same substrate.

The substrate is made of a material such as a crystal that consists chiefly of molybdenum, a crystal that consists chiefly of titanium, a crystal that consists chiefly of tungsten, a crystal that consists chiefly of a diamond, a crystal that consists chiefly of a metal nitride, a crystal that consists chiefly of carbide, a crystal that consists chiefly of alumina ceramics, a crystal that consists chiefly of a carbon graphite, a crystal that consists chiefly of quartz, and a crystal that consists chiefly of alumina, which are provided with an erosion resistance property and a corrosion resistance property to tin, a pressure resistance property, and a heat resistance property. As an example of a crystal that consists chiefly of alumina, a crystal of ruby and a crystal of sapphire can be mentioned for instance.

Tin in the target generating unit 120 is heated up to a temperature of at least 230° C. by the heating device 124 to be a molten metal. An Ar gas is introduced from the gas inflow port 123, and pressurizes a liquid level of tin in a molten state. By this step, a metal in a molten state can be output. By applying a vibration to the nozzle part 121 by an operation of the vibration generating unit 125, a droplet 201 having a small diameter is generated.

As described above, an inner surface of a substrate that comes into contact with tin in a molten state is polished in order to suppress a generation of a particle. A surface roughness of a surface that comes into contact with tin in a molten state is specified to be a value of 1/10 or 1/100 or less of a diameter of a nozzle. By this configuration, the nozzle part 121 can be prevented from being clogged, and a stability of a target material that is output from the nozzle can be improved.

Embodiment 10

Figure 13:
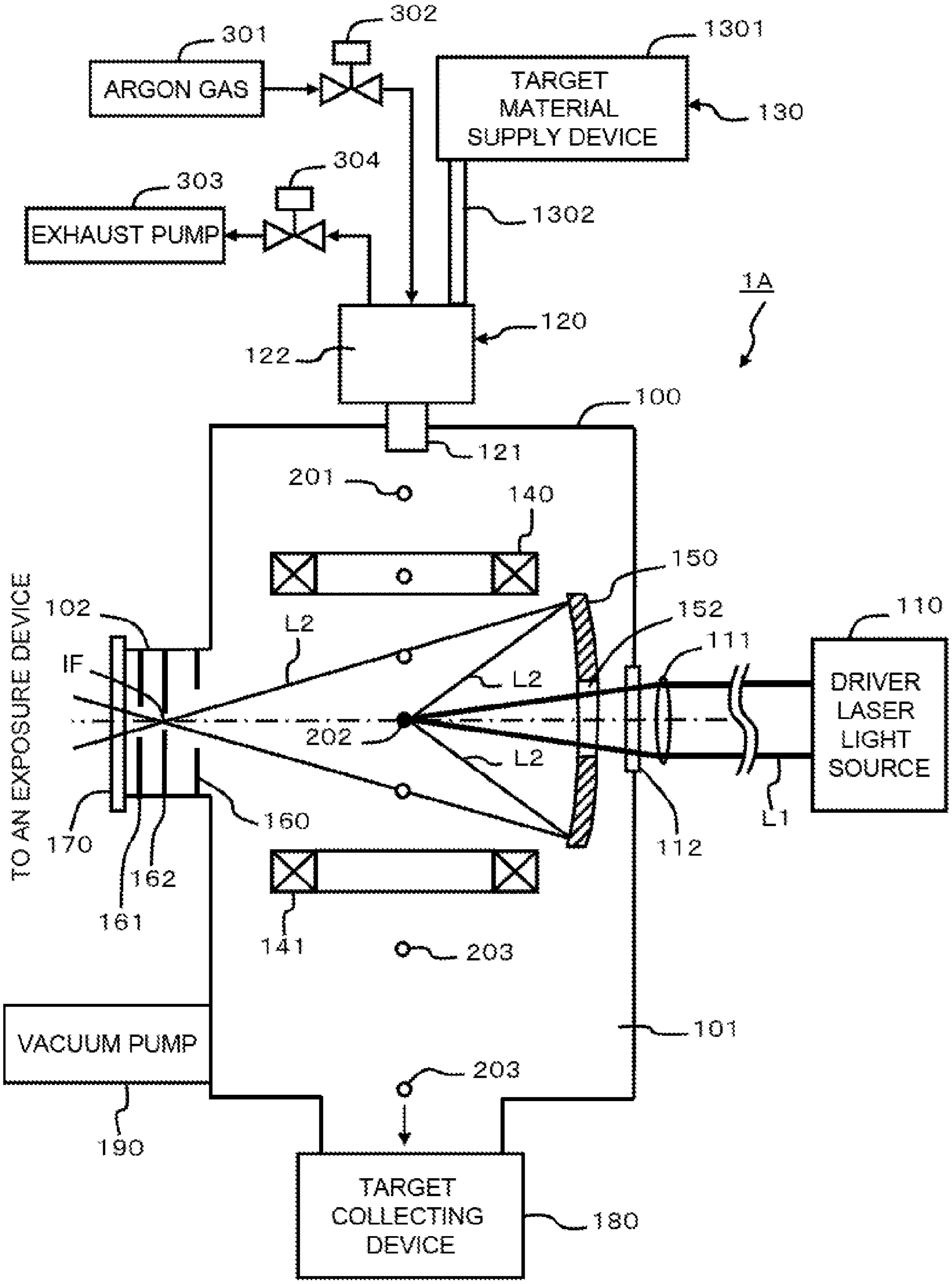
FIG. 13 is a block diagram showing an extreme ultraviolet light source device in accordance with a tenth embodiment of the present invention.

A tenth embodiment of the present invention will be described in the following with reference to FIGS. 13 and 14. As shown in the whole block diagram of FIG. 13, the extreme ultraviolet light source device 1A in accordance with the present embodiment is provided with a target material supply device 130 that automatically supplies tin as a target material to the target generating unit 120. The target material supply device 130 is provided with a target supply device body 1301 and a supply pipe line 1302 that connects between the target supply device body 1301 and the tank part 122 of the target generating unit 120.

Figure 14:
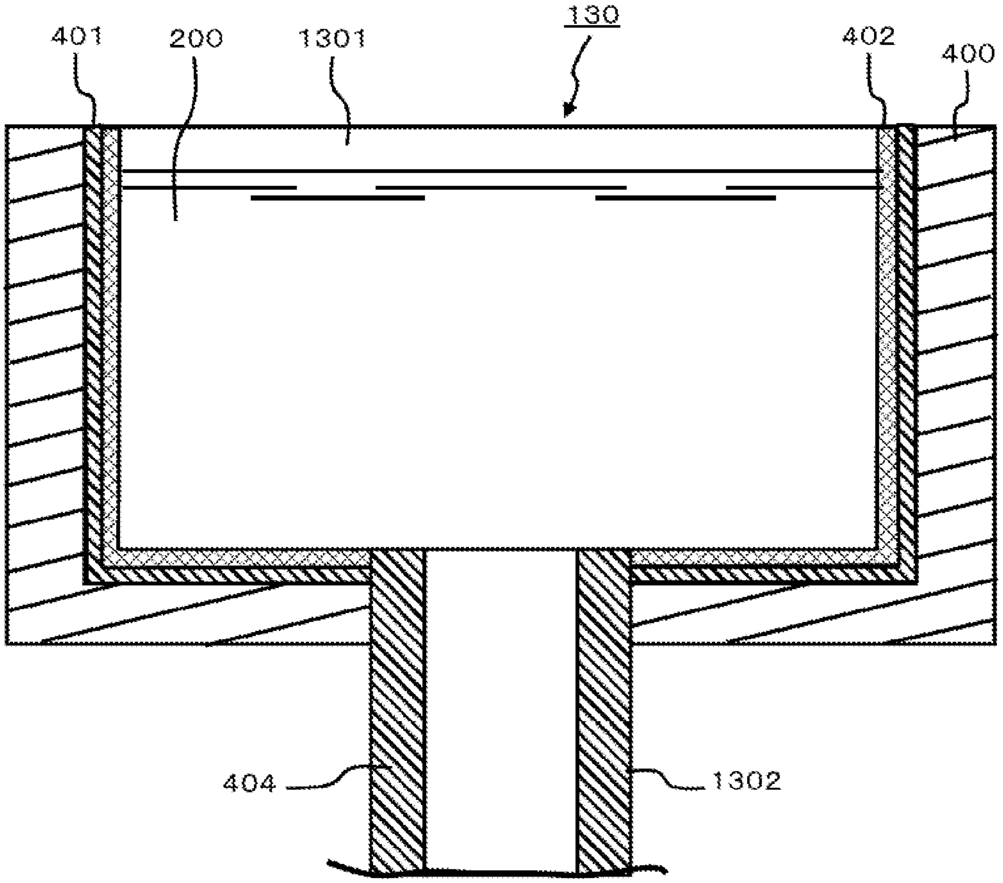
FIG. 14 is a cross-sectional view showing a target material supply device.

FIG. 14 is a cross-sectional view showing a target material supply device 130. A first protective layer 401 and a second protective layer 402 are formed on the inner surface of the substrate part 400 of the target supply device body 1301. Tin in a molten state or in a state of solid is held in the target supply device body 1301.

The supply pipe line 1302 is attached to the lower side of the target supply device body 1301. The substrate part 404 of the supply pipe line 1302 is made of a material such as a crystal that consists chiefly of molybdenum, a crystal that consists chiefly of titanium, a crystal that consists chiefly of tungsten, a crystal that consists chiefly of a diamond, a crystal that consists chiefly of a metal nitride, a crystal that consists chiefly of carbide, a crystal that consists chiefly of alumina ceramics, a crystal that consists chiefly of a carbon graphite, a crystal that consists chiefly of quartz, and a crystal that consists chiefly of alumina, which are provided with an erosion resistance property and a corrosion resistance property to tin, a pressure resistance property, and a heat resistance property.

The present embodiment that is configured as described above has an operation effect equivalent to that of the first embodiment. Moreover, in the present embodiment, the extreme ultraviolet light source device is provided with a target material supply device 130 that supplies a target material to the target generating unit 120, and a surface that comes into contact with tin in the target material supply device 130 is configured to be provided with an erosion resistance property and a corrosion resistance property to tin. Consequently, since a target material of a sufficient amount can be used, a target can be ejected for a long period of time. Moreover, even in the case in which a target is ejected for a long period of time, the target material supply device 130 and the target generating unit 120 can be suppressed from being eroded and corroded by tin. As a result, even in the case in which the extreme ultraviolet light source device 1A is operated for a long period of time, a reliability of the extreme ultraviolet light source device 1A can be maintained.

Embodiment 11

Figure 15:
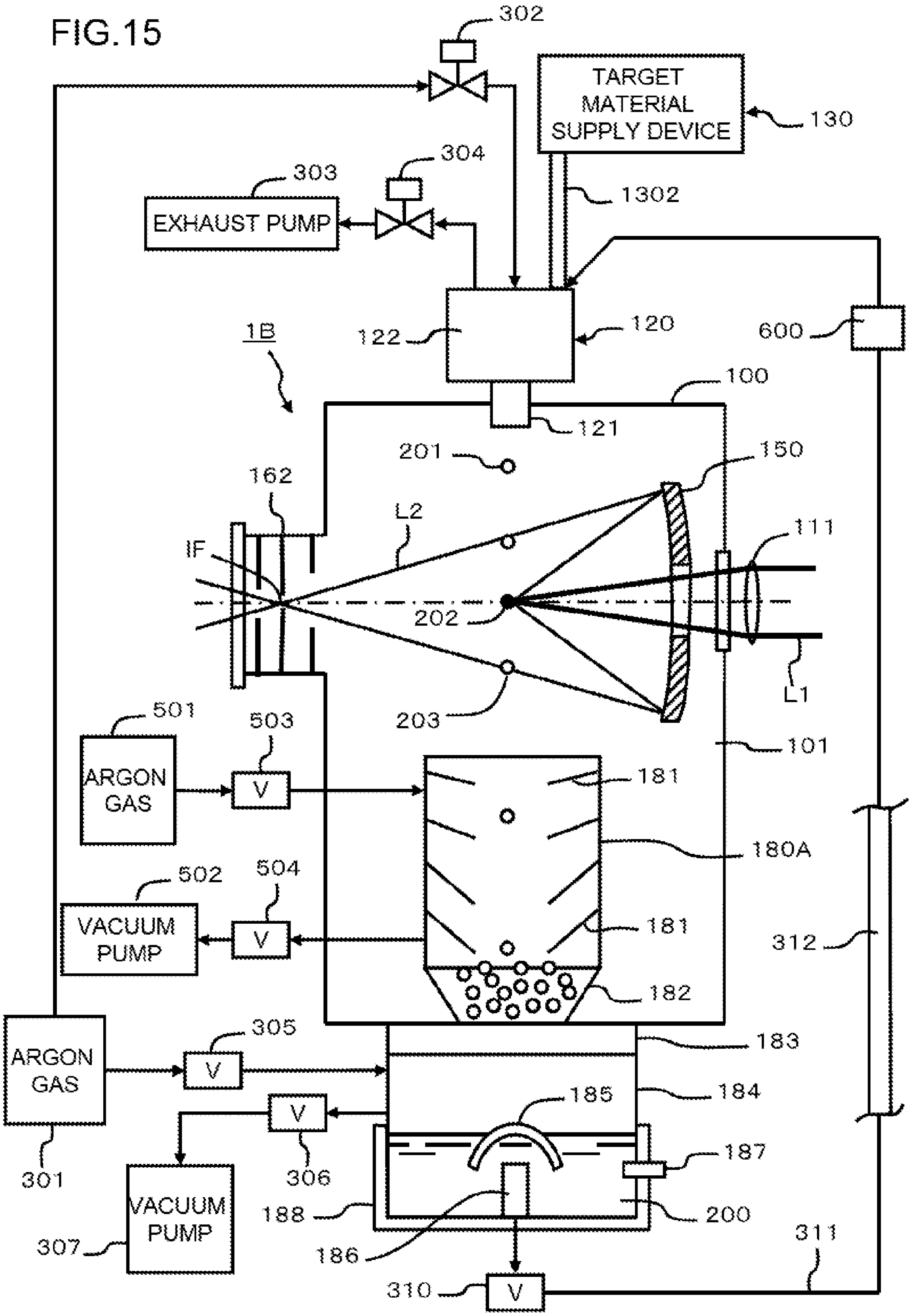
FIG. 15 is a block diagram showing an extreme ultraviolet light source device in accordance with an eleventh embodiment of the present invention.

An eleventh embodiment of the present invention will be described in the following with reference to FIG. 15. In the present embodiment, an unused target 203 that has been collected is returned to the target generating unit 120, whereby a target material can be used in an effective manner and a continuous operating time of the extreme ultraviolet light source device 1B can be lengthened. For a comprehension of the present embodiment, the description of Japanese Patent Application Laid-Open Publication No. 2008-226462 can be referred to as needed.

An argon gas tank 501 is connected to the upper side of a target collecting device 180A (an inflow side of an unused target 203) via a valve 503. A vacuum pump 502 is connected to the lower side of the target collecting device 180A (an outflow side of an unused target 203) via a valve 504. By an argon gas that flows from the upper side to the lower side in the target collecting device 180A, an unused target 203 in a molted state is cooled and solidified in the target collecting device 180A. By this configuration, the collector mirror 150 and so on can be prevented from being contaminated by a target material that is generated from the unused target 203.

A plurality of opening boards 181 are formed separately in an axial direction on an inner circumferential surface of the target collecting device 180A. A hole in which the unused target 203 passes through is formed at the center part of each opening board. A size of the hole of each opening board 181 is specified to be smaller for a board disposed at a lower location. By the opening boards 181, an argon gas in the target collecting device 180A can be suppressed from leaking in the chamber 101.

The unused target 203 that has passed through a hole of each opening board 181 is collected in a collection part 182 that collects a target material. The unused target 203 that has been collected is supplied to a target regenerating device 184 via a gate valve 183.

The target regenerating device 184 is a device that regenerates the unused target 203, and is connected to the lower side of the target collecting device 180A. The target regenerating device 184 is provided with a temperature sensor 187 and a heating device 188. The heating device 188 heats the unused target 203 that has been supplied into the target regenerating device 184 to be a temperature in the range of 230° C. to 400° C. to convert the unused target 203 to a target material 200 in a molten state.

An argon gas tank 301 is connected to the target regenerating device 184 via a valve 305. Moreover, a vacuum pump 307 is connected to the target regenerating device 184 via a valve 306.

By supplying an argon gas from the argon gas tank 301 to the target regenerating device 184 and pressurizing the argon gas in the state in which the gate valve 183 is closed, the target material 200 in a molten state is transferred to the target generating unit 120 via a pipe 311 or the like.

An argon gas in the target regenerating device 184 is exhausted by the vacuum pump 307, and a pressure in the target regenerating device 184 is reduced. In the case in which the gate valve 183 is then opened, the unused target 203 that has been stored into the target collection part 182 flows into the target regenerating device 184.

A suction pipe 186 that suctions the target material 200 in the target regenerating device 184 is formed in such a manner that the suction pipe 186 is protruded upward from the lower side of the target regenerating device 184. A dome 185 is formed in such a manner that the dome 185 covers an admission port of the suction pipe 186. Since an impurity floats around a liquid level of the target material 200 in a molten state, the dome 185 covers the suction pipe 186 in order to prevent an impurity from being suctioned.

The suction pipe 186 is connected to the pipe 311 via a valve 310. A heating unit 312 such as a heater is disposed on the periphery of the pipe 311. By this configuration, the target material 200 in a molten state (tin in a molten state) that has been suctioned from the suction pipe 186 is supplied in a molten state to the target generating unit 120.

Moreover, in the present embodiment, a filter 600 is disposed along the path of the pipe 311. A role of the filter 600 is to remove a solid particle or the like in a target material that has been collected. The filter 600 can be configured as a porous filter made of a material such as alumina, silica, and silicon carbide. Alternatively, the filter 600 can also be made of a material such as molybdenum, titanium, tantalum, and a carbon fiber. Or more specifically, a material of a substrate of the filter 600 can be made of a sintered metal of a stainless steel or a fiber of a stainless steel, and the surface of the substrate can be coated with a metal nitride, a metal oxide, metal carbide, molybdenum, tungsten, or ceramics to configure the filter 600.

Moreover, in the present embodiment, the surface of a filter housing that comes into contact with tin in a molted state and a material of the substrate of the filter housing are configured as described in the above embodiments. The periphery of the filter housing is covered by the heating unit 312 to be heated. Consequently, tin in the filter 600 can be prevented from being solidified.

Moreover, in the present embodiment, the filter 600 is disposed along the path of the pipe 311 that is connected between the target regenerating device 184 and the target generating unit 120. However, the location of the filter 600 is not limited to this configuration example. In the case of the embodiment shown in FIG. 13, the filter 600 can also be disposed between the target material supply device 130 and the target generating unit 120. Moreover, in the cases of the embodiments shown in FIGS. 2, 8, 10, and 11, the filter 600 can also be disposed between the tank part 122 and the nozzle part 121.

In the present embodiment, a part provided with a surface that comes into contact with tin in a molten state, such as the target generating unit 120, the target collecting device 180A, the target regenerating device 184, the pipe 311, the valve 310, and the target material supply device 130, is provided with an erosion resistance property to tin.

As a method for providing an erosion resistance property to tin, as described in the above embodiments, there can be mentioned for instance a first method for forming one or a plurality of protective layers on the surface of the substrate part and a second method for forming the whole substrate part made of a material provided with an erosion resistance property, a pressure resistance property, and a heat resistance property.

By the first method, an erosion resistance property can be achieved at a relatively low cost. However, for the first method, it is hard to form a protective layer on a narrow part or a slim location in some cases. In that case, the second method can be used.

The present embodiment that is configured as described above has an operation effect equivalent to that of the first embodiment. Moreover, in the present embodiment, the unused target 203 is collected and regenerated for a recycle, whereby a target material can be utilized without an ineffective manner.

While the preferred embodiments in accordance with the present invention have been described above, the present invention is not limited to the embodiments described above. Those skilled in the art can carry out various changes, modifications, and functional additions without departing from the scope of the present invention. Moreover, the embodiments described above can be properly combined with each other as needed.

EXPLANATION OF REFERENCES

1, 1A, 1B: EUV light source device
100: Vacuum chamber
101: First chamber
102: Second chamber
110: Driver laser light source
111: Light focusing lens
112: Incident window
120: Target generating unit
121, 121A, 121B, 121C: Nozzle parts
122, 122A, 122B: Tank parts
123: Gas inflow port
124: Heating device
125: Vibration generating unit
130: Target material supply device
140, 141: Magnetic field generating coils
150: EUV light collector mirror
152: Incident hole
160, 161: Bulkhead apertures
162: IF aperture
170: Gate valve
180, 180A: Target collecting devices
181: Opening board
182: Collection part
184: Target regenerating device
185: Dome
186: Suction pipe
187: Temperature sensor
188: Heating device
190: Vacuum pump
200: Target material
201: Target
202: Target plasma
203: Unused target
301, 501: Argon gas tanks

302, 304, 305, 306, 310, 503, 504: Valves
303: Exhaust pump
307, 502: Vacuum pumps
311: Pipe
312: Heating unit
400, 404: Substrate parts
401, 402, 401A, 402A, 403: Protective layers
600: Filter
1301: Target supply device body
1302: Supply pipe line

What is claimed is:

1. An extreme ultraviolet light source device comprising:

a chamber; and a target generating unit configured to supply the target material into the chamber, the target material being irradiated with a laser beam in the chamber to generate an extreme ultraviolet light, wherein the target generating unit has a region that comes into contact with the target material in a molten state, the region having a surface roughness Ra of 1 μm or less, and wherein the region includes a first region that is formed on a surface part and a second region that is formed on a surface part having concavity and convexity.

2. The extreme ultraviolet light source device according to claim 1, wherein the region is coated with a material.

3. The extreme ultraviolet light source device according to claim 1, wherein the target generating unit has a substrate formed of a material, and the region on the substrate is formed of the same material as that of the substrate.

4. The extreme ultraviolet light source device according to claim 2, wherein the material with which the region is coated contains at least one of a metal nitride, a metal oxide, metal carbide, molybdenum, tungsten, ceramics, titanium, a diamond, a carbon graphite, and quartz.

5. The extreme ultraviolet light source device according to claim 3, wherein the material of the substrate contains at least one of a crystal that consists chiefly of molybdenum, a crystal that consists chiefly of titanium, a crystal that consists chiefly of tantalum, a crystal that consists chiefly of diamond, a crystal that consists chiefly of a carbon steel, and a crystal that consists chiefly of alumina.

6. The extreme ultraviolet light source device according to claim 1, wherein:

the target material chiefly comprises tin, and the region is in contact with tin in a molten state.

7. The extreme ultraviolet light source device according to claim 2, further comprising a target collecting device configured to collect an unused target material which is supplied from the target generating unit into the chamber, but not irradiated with the laser beam, wherein the target collecting device has a region that comes into contact with the unused target material in a molten state, the region of the target collecting device is formed of a material which is the same as the material with which the region of the target generating unit is coated.

8. The extreme ultraviolet light source device according to claim 1, further comprising a target supply device configured to supply the target material to the target generating unit, wherein the target supply device has a region that comes into contact with the target material in a molten state, the region having a surface roughness Ra of 1 μm or less.

9. The extreme ultraviolet light source device according to claim 3, further comprising a target collecting device configured to collect an unused target material which is supplied from the target generating unit into the chamber, but not irradiated with the laser beam, wherein the target collecting device has a region that comes into contact with the unused target material in a molten state, the region of the target collecting device is formed of a material which is the same as that of the substrate of the target generating unit.

10. The extreme ultraviolet light source device according to claim 1, wherein the region has a polished surface by any one of a chemical polishing, an electrolytic polishing, a barrel polishing, a magnetic polishing, and a physical polishing, or a combination thereof.

11. The extreme ultraviolet light source device according to claim 1, wherein the target generating unit comprises a nozzle, a tank, and a filter between the nozzle and tank.

12. The extreme ultraviolet light source device according to claim 11, wherein the filter is formed of any of alumina, silica, silicon carbide, molybdenum, titanium, tantalum, and a carbon fiber.

13. The extreme ultraviolet light source device according to claim 11, wherein the filter comprises a stainless steel substrate, a surface of which is coated with any of a metal nitride, a metal oxide, metal carbide, molybdenum, tungsten, and ceramics.

* * * * *